No. 862,121. PATENTED JULY 30, 1907.
J. T. FOLSOM.
BISCUIT MAKING MACHINE.
APPLICATION FILED SEPT. 19, 1906.
3 SHEETS—SHEET 2.
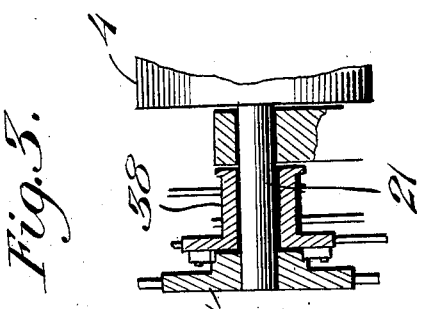
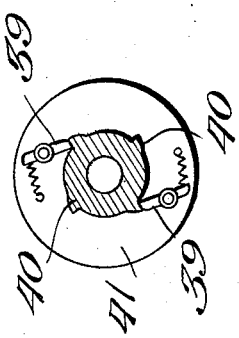
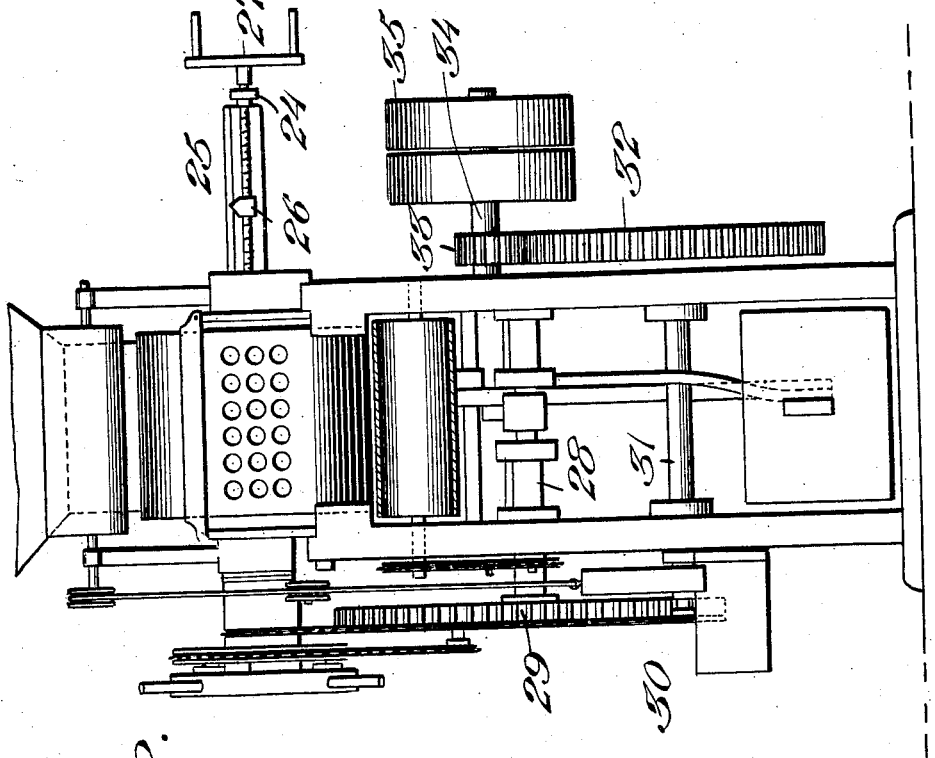
Inventor
John T. Folsom.
Witnesses
K. Allen
C. C. Hines.
By Victor J. Evans
Attorney No. 862,121. PATENTED JULY 30, 1907.
J. T. FOLSOM.
BISCUIT MAKING MACHINE.
APPLICATION FILED SEPT. 19, 1906.

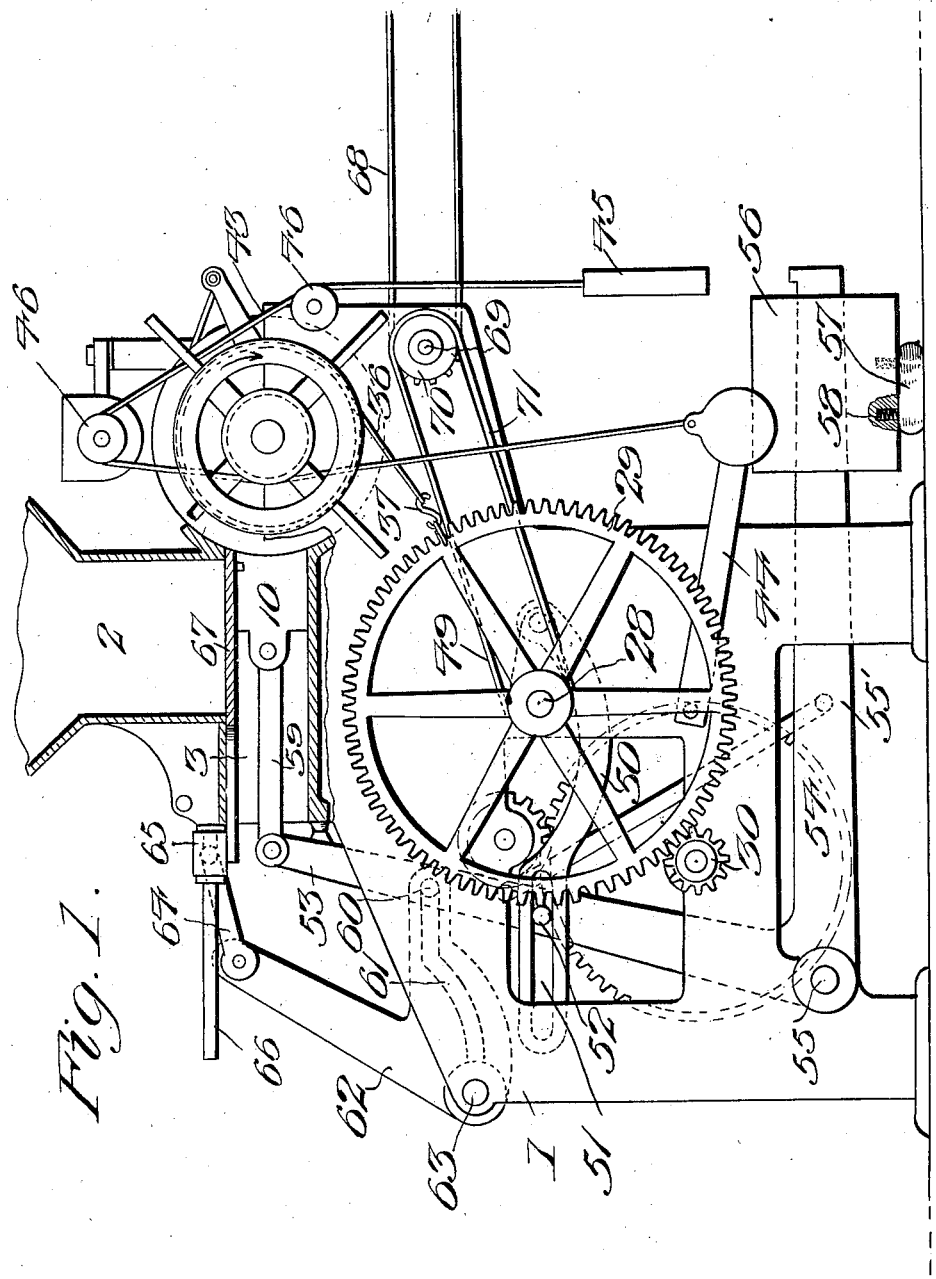

3 SHEETS—SHEET 3.

Witnesses
F. Allen
C. C. Hines.

Inventor
John T. Folsom.
By Victor J. Evans.
Attorney

UNITED STATES PATENT OFFICE.

JOHN TOWNSEND FOLSOM, OF BINGHAMTON, NEW YORK, ASSIGNOR, BY DIRECT AND MESNE ASSIGNMENTS, TO DUTCHESS TOOL COMPANY, OF FISHKILL-ON-THE-HUDSON, NEW YORK, A CORPORATION OF NEW YORK.

BISCUIT-MAKING MACHINE.

No. 862,121.           Specification of Letters Patent.           Patented July 30, 1907.

Application filed September 19, 1906. Serial No. 335,286.

*To all whom it may concern:*

Be it known that I, JOHN TOWNSEND FOLSOM, a citizen of the United States of America, residing at Binghamton, in the county of Broome and State of New York, have invented new and useful Improvements in Biscuit-Making Machines, of which the following is a specification.

This invention relates to a machine for making biscuits, rolls and the like, and particularly to a machine for forming the dough into biscuits or rolls of a prescribed size and weight ready to be baked in an oven.

The objects of the invention are, first, to provide a machine of this character which shall be entirely automatic in action and by which the rolls or biscuits will be rapidly formed into the desired shape and of the requisite weight without the use of hand labor of any kind; second, to provide a machine of simple and inexpensive construction which will operate without excessively vibrating the frame of the machine or floor of the building on which it is supported; third, to provide means whereby the sizes of the mold cavities may be conveniently varied to form biscuits or rolls of different sizes; and, finally, to generally simplify and improve the construction and increase the practical efficiency of machines of this type.

With the above and other objects in view, the invention consists of the novel construction, combination and arrangement of parts hereinafter fully described and claimed, reference being had to the accompanying drawings, in which:—

Figure 5:
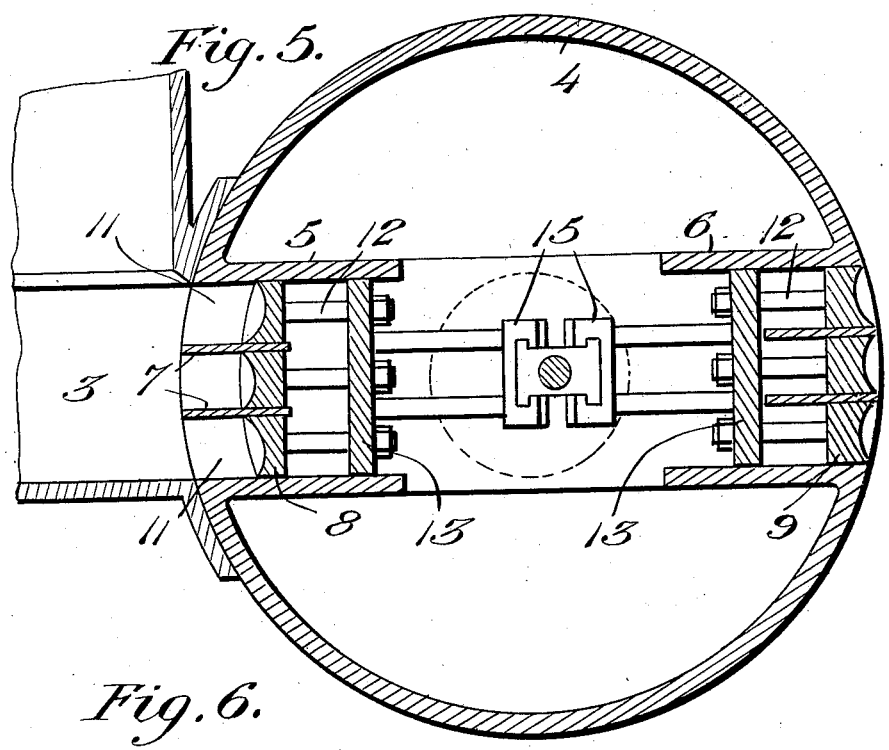
Figure 6:
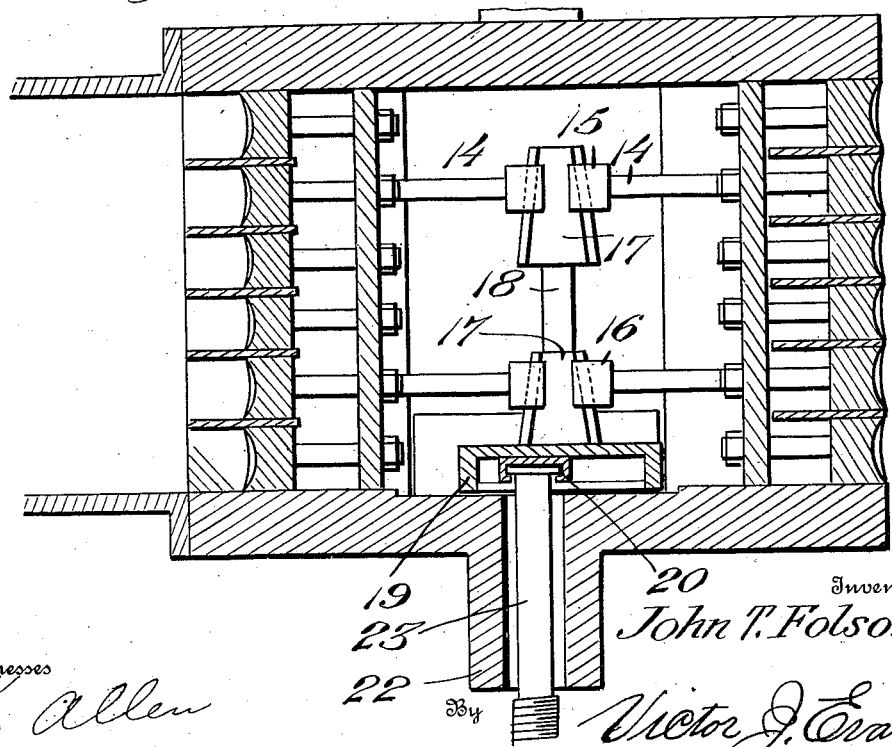

Figure 1 is a view in side elevation, with portions in section, of a biscuit or roll-making machine embodying my invention. Fig. 2 is a view in elevation looking toward the delivery end of the machine, the delivery belt being shown in cross section. Fig. 3 is a section on the line 3—3 of Fig. 1. Fig. 4 is a section on the line 4—4 of Fig. 3. Fig. 5 is a vertical longitudinal section, on an enlarged scale, through the mold wheel or cylinder. Fig. 6 is a horizontal cross section through the same.

Referring to the drawings, 1 designates a frame of suitable form, size and construction, upon which is supported a dough hopper 2 from which the dough passes by gravity into a feed passage 3. Arranged at the outlet end of said passage is a hollow mold wheel or cylinder 4 provided at its front and rear with mold chambers 5 and 6 opening through the periphery thereof and adapted to communicate alternately on each half revolution of the wheel with said feed passage. Each mold chamber is provided with a desired number of partitions 7 with which coöperate opposite plungers 8 and 9 and a feed plunger 10 to form the mold cavities 11 in which the dough is forced and shaped into biscuits or rolls of a prescribed size and weight. The plungers 8 and 9 are connected by bolts 12 with heads 13 fixed to inwardly extending rods 14 provided at their inner ends with sleeves 15 & 16 having a dove-tailed engagement with wedges 17. The wedges are connected for movement in unison by an interposed stem or shank 18, and the outer wedge is fixed to a hollow head or box 19 in which is arranged a sliding bearing 20. The mold wheel or cylinder is concentrically fixed at one end upon a horizontal shaft 21 suitably journaled on the frame and is provided at its opposite end with a hub or boss 22 through which extends an adjusting stem or shaft 23 swiveled at its inner end in the bearing 20 and journaled at its outer end in a bearing 24 carried by a bracket 25 extending from one side of the frame. The shaft 23 is screw threaded for a portion of its length to engage a nut 26 fixed on the bracket and is provided at its outer end with an operating handle 27, the construction being such that when said shaft is turned in one direction or the other motion will be communicated to the box or head 19 to shift the same in or out and thereby adjust the wedges 17 to move the plungers 8 and 9 toward or from each other, thereby regulating their extent of projection and the sizes of the mold cavities 11 for the formation of the dough into biscuits or rolls of different sizes and weights. The plungers 8 and 9 and box 19, with the adjusting mechanism just described, turn with the mold wheel or cylinder, but the adjusting wedges are arranged eccentric to the axis of said wheel or cylinder, so that as the latter rotates the forming plunger in the inner mold chamber facing the feed passage 3 will be drawn inward to form the mold cavities 11, while the companion plunger will be forced outward to expel the previously formed biscuits or rolls. Fig. 5 shows the plunger 8 drawn inward into the mold chamber 5 to a prescribed extent to form the set of mold cavities 11 facing the passage 3 for the reception of the dough, and the plunger 9 adjusted to the outer end of the mold chamber 6 to expel the biscuits or rolls previously formed in the mold cavities thereof. It will be observed that the plungers 8 and 9 are slotted for sliding engagement with the partitions 7 to perform the described functions, while the box or head 19 is of sufficient size to permit it to shift relatively to the bearing 20 therein to secure the in and out adjustments of the plungers without interference therefrom. Carried by a shaft 28 journaled on the frame is a master gear wheel 29 which receives motion from a pinion 30 on a transmission shaft 31, on which is also a gear 32 meshing with a pinion 33 on a drive shaft 34 provided with fast and loose pulleys 35, through which said shaft is driven through an ordinary type of belting.

A cord, chain or like flexible element 36 is connected at one end with the gear 29, as at 37, and is fixed and wound at its opposite end to and around a drum 38 loose on the shaft 21, which drum is provided with spring pawls 39 adapted to engage ratchet teeth 40 on a clutch wheel 41 fixed to the shaft 21, the construction being such that when the drum 38 is turned to the right the pawls will engage the teeth 40 and connect the drum with the shaft to turn the mold wheel or cylinder 4, while on the rotation of the drum to the left the pawls will ride over the teeth, allowing the drum to have retrograde rotation without affecting the mold wheel. The clutch wheel 41 is provided with radial spokes or handles 42 by which it may be turned to rotate the mold wheel or cylinder manually to work the molding devices 3 in the event that any undue stiffness or clogging should occur. The drum is automatically retracted after the mold wheel has been turned to the prescribed extent by means of a cord or cable 43 intermediately wound thereon, one end of said cord being connected with a weighted controlling arm or lever 44 pivoted to the frame, while the other end of the cord carries a counteracting weight 45, that portion of the cord carrying the weight 45 being hung and guided upon pulleys 46 suitably located between the weight and the point of connection of such portion of the cord with the drum.

On the shaft 28 is a crank arm 49 to which is pivoted one end of a controlling link or lever 50, the opposite end of which is normally straight and horizontal and provided with a longitudinal slot 51 receiving a pin or stud 52 arranged on the vertical arm 53 of a bell crank operating lever 54, which is fulcrumed at the intersection of its arms upon the frame, as indicated at 55. The free end of the horizontal arm 55' of this lever carries a weight 56 provided with a cushioned bumper 57 adapted to contact with the floor at the limit of downward movement of said arm. This bumper is preferably formed of a block of rubber which may be backed and reinforced by cushioning springs 58 fitted in sockets in the weight 56, thus allowing the weight to contact with the floor without undue noise or jars and without transmitting excessive strain or vibrations to the floor or to the frame of the machine.

The upper end of the arm 53 is connected with the plunger 10 by a link 59, and above the stud 52 and between said stud and point of connection of the arm with the link, the said arm 53 is provided with a second pin or stud 60 engaging a slot 61 in one arm of a bell crank lever 62 fulcrumed at 63 on the frame, the other arm of said lever being connected by a link 64 with a sleeve 65 arranged to slide on a guide 66 fixed to the frame, said sleeve being secured to a reciprocating cut-off 57 adapted to close the bottom of the hopper 2 and to serve the function of a knife to sever the portion of dough in the feed passage 3 from the body of dough contained in the hopper. The inner end of the slot 61 is straight and horizontal, while the outer end or portion thereof is curved on an arc radial to the fulcrum 63, the slot being of such peculiar form in order to provide for a properly timed operation of the cut-off, as hereinafter described.

Fig. 1 shows the positions of the parts at the time when the cut-off has severed the fed portion of dough and the feed plunger 10 has forced such severed portions of the dough into one of the sets of cavities in the mold wheel. The parts are thus ready for the retractive movement and the rotation of the mold wheel to discharge the formed roll and bring the other set of mold cavities into position to receive the succeeding charge of dough. In the operation of the machine, the master wheel 29 rotates continuously to the right, and it will thus be understood that as it continues to turn from the position shown in Fig. 1, it will draw on the cable 36 until said cable is fully unwound, which will occur when the connection 37 is at the diametrically opposite point in the circular plane of rotation of the wheel. This action will cause the drum 38 to be turned to the right against the resistance of the retracting cable 43, which will be wound upon the drum and lift the weighted lever arm 44, thereby causing the pawls 39 to engage the teeth 40 and transfer motion in the manner before described to the mold wheel 4, which will make one complete half revolution in the described movement of the connection 37, with the result of shifting the filled set of mold cavities to the discharge point and bringing the empty set into receiving position relative to the receiving passage 3, the plungers 8 and 9 being shifted in an obvious manner in such action to discharge the rolls from the filled cavities and to open up the other cavities for the reception of the dough. When the connection 37 reaches the diametrically opposite side of the gear 29 from that shown in Fig. 1, the cable 36 will be fully extended and, as said gear continues to rotate, will slacken, thus allowing the weighted lever 44 through a reverse movement of cable 43 under the action of weighted lever 44 to restore the drum 38 to normal position for the succeeding operation, the lever 44 and weight 45 exerting a mutual counterbalancing resistance to insure the free action of the cable 43 in its movements.

On the movement of the gear 29 from the position shown in Fig. 1 the crank 49 transfers motion to the link 50, which swings until the inner end wall of slot 51 engages the stud 52, when the arm 53 of bell crank lever 54 will be swung rearwardly, thus retracting the plunger 10. Such movement of the arm 53 will continue and the stud 60 will move in the straight portion of the slot 61 without materially effecting the lever 62. When said stud 60 reaches the curved portion of said slot, however, lever 62 will be swung rearwardly to retract the cut-off 67, thus allowing the dough to drop from the hopper into the feed passage 3 in advance of the retracted plunger. On the remaining half revolution of the gear 29, while the mold wheel is mantained in receiving position, the link 50 returns to normal position, allowing the lever 54 to gradually return to such position by the action of its weighted arm 55', thus slowly moving the plunger 10 forward. On such movement of lever 54 the stud 60 acting on the curved portion of slot 61 projects the cut-off 67 forward in advance of the plunger and at a greater rate of speed, so that the cut-off will sever the dough in the passage 3 from the body of dough in the hopper and close the bottom of the hopper while the plunger 10 is feeding forward to force the charge of dough from the feed passage into the receiving mold cavities in the mold wheel.

The operation is then repeated as before described. The biscuits or rolls discharged from the mold wheel fall upon a feed belt 68 passing at its inner end around a shaft 69 on which is a sprocket wheel 70, connected by a chain 71 with a sprocket wheel 72 on the shaft 28, whereby said belt is driven. The belt may lead to a suitable point where the biscuits or rolls are to be placed in pans for transfer to the proofing room of the bake shop until ready for baking.

It will thus be seen that the invention provides a machine of the character described which while simple of construction will produce a large number of biscuits or rolls at each complete operation and a maximum number within a given length of time, and that the construction is also such as to enable biscuits or rolls of any prescribed size and weight within reasonable limits to be produced.

It will be observed that the counterpoised cable 43 permits the drum 38 to have easy movement and to be efficiently controlled, while the bumper 57 prevents jarring of the floor or machinery upon the return of the lever 54 to normal position.

The machine possesses a material advantage in providing for the production of biscuits or rolls of proper weight and of the required shape ready for baking without a secondary hand working of any character.

Having thus described the invention, what is claimed as new, is:—

1. In a machine of the character described, and in combination with suitable operating and dough-feeding mechanism, a rotary mold wheel provided at diametrically opposite sides with mold chambers having subdividing partitions therein, plungers in said mold chambers slotted to receive and slidably engage the partitions, heads connected with the plungers, rods extending inwardly from the heads and provided at their inner ends with sleeves, a connection between the sleeves of the rods arranged transversely of and eccentric to the axis of the wheel, whereby in the rotation of the wheel the plungers will be alternately adjusted to receiving and discharging positions, said connection being slidably mounted and provided with wedges engaging the sleeves to effect the adjustment of the plungers, and means for sliding said connections.

2. In a machine of the character described, the combination with dough-feeding and molding mechanism, of actuating means for said mechanism including a lever, a controlling weight carried by the lever, an elastic floor-engaging bumper carried by the weight, and springs backing said bumper and seated in recesses in the weight.

3. In a machine of the character described, and in combination with suitable operating and dough-feeding mechanism, a rotary mold wheel provided with mold chambers, forming plungers slidably mounted in said chambers, arms extending inwardly from the plungers and provided with sleeves, wedges movable at right angles to the plane of rotation of the wheel and adjustably engaging the sleeves to slide the plungers in and out, and means for imparting motion to the wedges.

4. In a machine of the character described, and in combination with suitable operating and dough-feeding mechanism, a rotary mold wheel provided with mold chambers, forming plungers slidably mounted in the chambers and having inwardly extending arms, adjusting wedges movable at right angles to the plane of rotation of the wheel and engaging said arms to adjust the plungers in and out, a sliding bearing carried by the wedges, and a shaft extending outwardly through one of the journals of the roll and swiveled in said bearing.

5. In a machine of the character described, the combination of a frame having a hopper and a feed passage, a rotary mold wheel, clutch mechanism embodying a drum for intermittently rotating the mold wheel, a driven gear, a winding connection between said gear and drum, a cut-off, a feeder operating in the feed passage, bell crank levers connected with the cut-off and feeder, one of said levers having a cam slot and pin engagement with the other, and means for operating said levers and returning the same and drum to normal position.

6. In a machine of the character described, the combination with a frame having a hopper and a feed passage communicating therewith, of a feed plunger slidable in said passage, a reciprocating cutting knife arranged at the bottom of the hopper above the plunger, a rotary mold wheel, means for operating the wheel including a shaft carrying a crank arm, a weighted bell crank lever provided upon one of its arms with a pair of pins or studs, a link pivoted at one end to the said crank arm and having a slotted free end engaging one of said pins or studs, whereby the plunger is adapted to be operated from the shaft, and a second bell crank lever having one of its arms connected with the cutter and its other arm provided with a slot having a straight portion and a curved portion engaging the other stud on the first named bell crank lever, the slots in the link and second bell crank lever being so arranged as to secure a determined time operation of the plunger and cutting knife, substantially as described.

7. In a machine of the character described, and in combination with suitable operating and dough-feeding mechanism, a rotary mold wheel provided at diametrically opposite sides with mold chambers, forming plungers slidably operating therein, connecting means between the plungers including a member extending transversely of the wheel and out of line with the axis thereof, said member being slidably mounted, means for sliding said member, and means associated with said member and operative by the sliding movement thereof to adjust the plungers in and out to regulate the size of the mold chambers.

8. In a machine of the character described, and in combination with suitable operating and dough-feeding mechanism, a rotary mold provided at diametrically opposite sides with mold chambers, forming plungers slidably mounted in said chambers, a rod or bar extending transversely of the wheel and carrying wedges operatively connected with the plungers, said rod or bar being slidably mounted and eccentrically arranged with relation to the axis of the wheel, whereby in the rotation of the wheel the plungers will be alternately adjusted to receiving and discharging positions, and means for sliding said rod or bar to effect the adjustment of the plungers to regulate the size of the mold chambers.

9. In a machine of the character described, and in combination with suitable operating and dough-feeding mechanism, a rotary mold wheel provided at diametrically opposite sides with mold chambers, forming plungers slidably mounted within the chambers, a rod or bar arranged transversely of the wheel and eccentric to the axis thereof, connecting means between the plungers and said rod or bar comprising engaging members on the plungers and wedges on the bar, whereby a sliding movement of the bar transversely of the wheel will adjust the plungers in and out, and an operating shaft swiveled and slidably connected at one end to one end of the rod or bar.

10. In a machine of the character described, and in combination with suitable operating and dough-feeding mechanism, a rotary mold wheel provided at diametrically opposite sides with mold chambers, plungers slidably mounted in the chambers, eccentric means connecting the plungers, whereby in the rotation of the wheel the plungers will be alternately adjusted to receiving and discharging positions, said means including a member slidable transversely of the wheel and provided with adjusting wedges to move the plungers in and out, and means for sliding said member.

11. In a machine of the character described, and in combination with suitable operating and dough-feeding mechanism, a rotary mold wheel provided at diametrically opposite sides with mold chambers, plungers operating therein, an eccentric support and connection for the plungers arranged to secure the alternate movement of the plungers to receiving and discharging positions in the rotation of the wheel, sliding wedges associated therewith for adjusting the plungers in and out, and means for operating the wedges.

12. In a machine of the character described and in combination with suitable operating and dough-feeding mechanism, a rotary mold wheel provided at diametrically opposite sides with mold chambers, plungers operating therein, rods extending from the plungers and provided at their inner ends with sleeves, a rod or bar extending transversely of the wheel and eccentric to the axis thereof and provided with wedges engaging said sleeve, a hollow box or head upon one end of said rod, and an operating screw shaft swiveled at one end in said box and extending through one of the sides of the wheel.

In testimony whereof, I affix my signature in presence of two witnesses.

JOHN TOWNSEND FOLSOM.

Witnesses:
ARCHIBALD HOWARD,
FRANK L. WOOSTER.